UNITED STATES PATENT OFFICE.

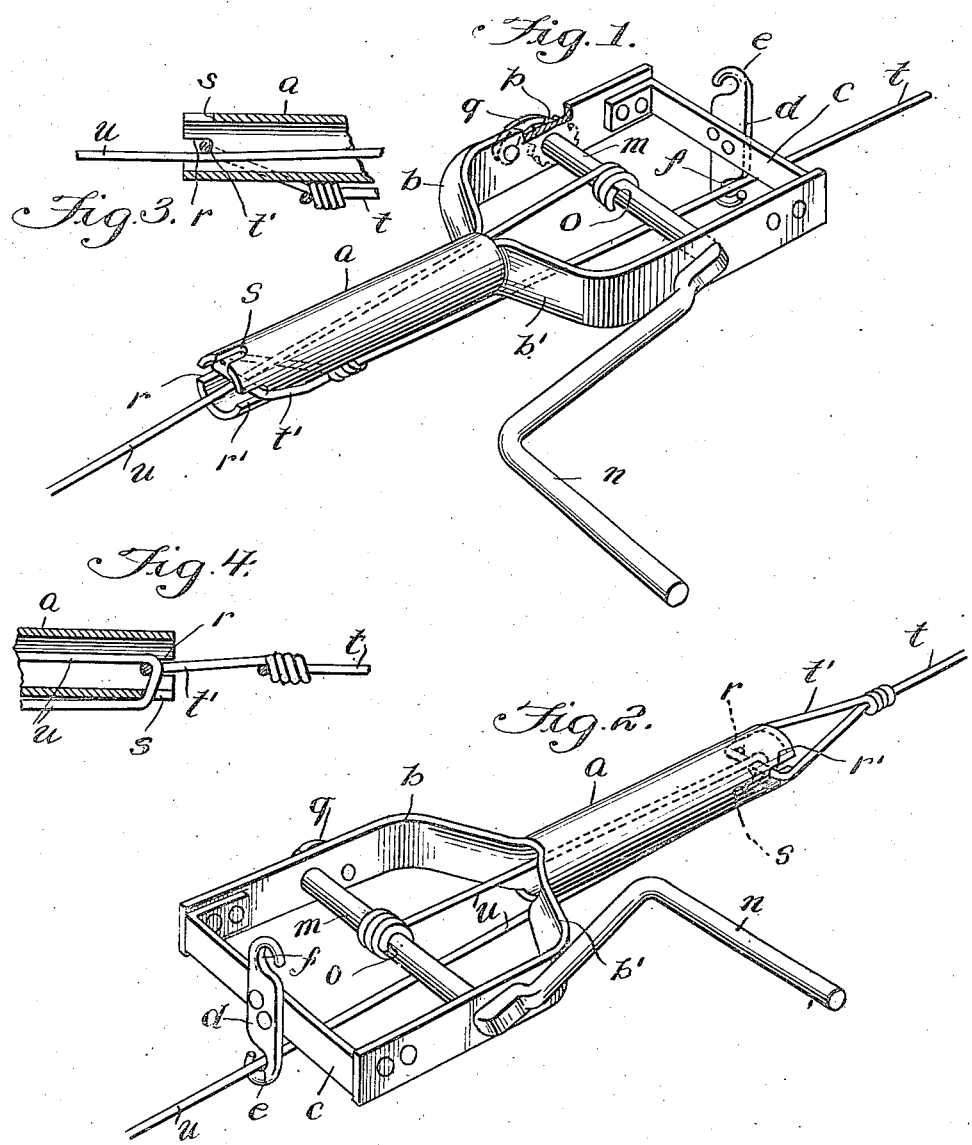

CHARLES HETTINGER, OF ANITA, IOWA.

SPLICING-TOOL FOR BARBED WIRE AND OTHER WIRES.

1,318,078.      Specification of Letters Patent.      Patented Oct. 7, 1919.

Application filed May 13, 1919. Serial No. 296,855.

*To all whom it may concern:*

Be it known that I, CHARLES HETTINGER, a citizen of the United States, residing at Anita, in the county of Cass and State of Iowa, have invented a certain new and useful Improvement in Splicing-Tools for Barbed Wire and other Wires, of which the following is a specification.

This invention relates to improvements in splicing tools for barbed wires, or any other kind of wires, used for fences and the like.

The object of the invention is to provide a simple and cheap splicing tool, effective in its operation, and easily handled.

The invention consists in the improved splicing tool, and in the combination and arrangements of the various parts thereof, substantially as will be hereinafter more fully described and finally embodied in the clauses of the claim.

In the accompanying drawings, in which like letters of reference indicate corresponding parts:

Figure 1, is a perspective view of my improved splicing tool, and

Fig. 2, a similar view, showing the wires to be spliced, in proper position, in and on the tool.

Fig. 3 is a partial cross-section of handle of tool and wires therein, showing wires in same position as in Fig. 1, and Fig. 4 is a partial cross-section of handle of tool and wires therein, showing wires as in position in Fig. 2.

In the drawings, $a$ is a hollow handle, preferably a piece of pipe, having its outer portion split to form a fork with prongs $b$ and $b^1$, the outer ends of which are connected by a cross bar $c$, carrying at its central portion, and at right angles thereto, a bar $d$, having in its end sections, hook shaped openings $e$ and $f$.

Parallel with the cross bar $c$, and in about the middle of the fork prongs $b$, $b^1$, is revolubly mounted a shaft $m$, provided with a crank handle and in its central portion with a hole $o$.

On the opposite end of the shaft $m$ and preferably on the outside of the fork portion $b$, of the handle $a$, is mounted a ratchet wheel $p$, controlled by a pawl $q$.

On the inner or free ends of the handle $a$, are arranged notches $r$, $r^1$, and $s$, respectively.

One end of the wire T is provided at its broken portion with a loop $t^1$, and is passed through hook or notch $f$ to and below the end of the handle $a$, and is hooked into notches $r$ and $r^1$.

The end $u$ of the other wire is passed through the hollow handle $a$, and into and through the hole $o$ in shaft $m$, and is tightened or coiled around the shaft by turning crank handle $n$.

To make the desired splice, the wire $t$ is now unhooked from notch $f$ in bar $d$, and the entire tool is turned backward until notch $e$ of bar $d$ engages the wire $u$, the latter resting in notch $s$.

The pawl $q$ is then released from the ratchet $p$, and the shaft $m$ turned backward by means of the crank $n$. The wire $t$ is then cut at the hole $o$ in shaft $m$, and is then wrapped around the other wire $u$ as will be manifest.

Having thus described my invention, what I claim as new and desire to secure by Letters Patent is:

1. A splicing tool, comprising a hollow handle having at one end a fork and at the other end notches, a cross bar connecting the end portions of the fork, a bar mounted on the central portion of the cross bar and at right angles thereto, and provided with hook shaped ends, a crank shaft revolubly mounted in the fork and parallel with the cross piece, and provided with a central hole or opening, a ratchet on said shaft, a pawl on the fork engaging said ratchet, all said parts substantially as and for the purposes described.

2. A splicing tool, comprising a hollow handle provided at one end with a series of notches and having its other end fork shaped, a connecting bar arranged on the free ends of said fork and carrying at right angles thereto another bar, the opposite ends of which latter are hook shaped, a shaft revolubly mounted in the fork and at right angles to the handle and provided with a central hole or opening and a pawl and ratchet arrangement on the fork and shaft respectively, all said parts substantially as for the purposes described.

In testimony whereof, I affix my signature, in the presence of two witnesses.

CHARLES HETTINGER.

Witnesses:
W. R. SPENCE,
J. W. NICHOLS.